(12) United States Patent
Hanamoto

(10) Patent No.: US 8,485,521 B2
(45) Date of Patent: Jul. 16, 2013

(54) AUTOMATIC DOCUMENT CONVEYING DEVICE AND IMAGE FORMING APPARATUS INCLUDING THE SAME

(75) Inventor: Katsuhiko Hanamoto, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 12/974,283

(22) Filed: Dec. 21, 2010

(65) Prior Publication Data

US 2011/0175277 A1 Jul. 21, 2011

(30) Foreign Application Priority Data

Jan. 19, 2010 (JP) ................................. 2010-009464

(51) Int. Cl.
*B65H 29/00* (2006.01)

(52) U.S. Cl.
USPC ........................................................ 271/186

(58) Field of Classification Search
USPC ..... 271/186, 65, 273, 274, 314, 272; 399/365
See application file for complete search history.

(56) References Cited

U.S. PATENT DOCUMENTS

| 4,645,195 A | * | 2/1987 | Scranton et al. | 271/245 |
| 5,449,160 A | * | 9/1995 | Hou et al. | 271/3.15 |
| 7,369,786 B2 | * | 5/2008 | Nagasu et al. | 399/68 |
| 2005/0263956 A1 | * | 12/2005 | Uchida et al. | 271/186 |

FOREIGN PATENT DOCUMENTS

| JP | 60-122648 | * | 7/1985 |
| JP | 60-160305 | * | 8/1985 |
| JP | 3-286288 | * | 12/1991 |
| JP | 5-40374 | | 2/1993 |
| JP | 2004-352434 | | 12/2004 |
| JP | 2005-247467 | | 9/2005 |

* cited by examiner

*Primary Examiner* — Thomas Morrison
(74) *Attorney, Agent, or Firm* — Smith, Gambrell & Russell, LLP

(57) ABSTRACT

Provided is an automatic document conveying device, including: a document feeding portion that feeds a document from a document stacking tray; a conveying portion that conveys the document which is fed, to a document reading portion; a discharge portion that discharges the document after being read to a discharge tray; a branching guide that switches a conveying path so that a second surface is read after a first surface of the document is read; and a switchback portion including a switchback roller pair for sending the document to the conveying portion again after the conveying path is switched by the branching guide, in which a switch of the conveying path by the branching guide and open/close of a nip of the switchback roller pair are performed in one drive portion.

5 Claims, 13 Drawing Sheets

AUTOMATIC DOCUMENT CONVEYING DEVICE AND IMAGE FORMING APPARATUS INCLUDING THE SAME

This application is based upon and claims the benefit of priority from the corresponding Japanese Patent Application No. 2010-009464 filed on Jan. 19, 2010, the entire contents of which are incorporated herein by reference.

BACKGROUND OF THE INVENTION

1. Field of the Invention

The present invention relates to an automatic document conveying device that conveys a document to a reading position automatically, and an image forming apparatus including the automatic document conveying device.

2. Description of Related Art

As an automatic document conveying device used in a copier, a scanner, a facsimile, etc., there are well-known automatic document conveying devices in a form capable of inverting front and back surfaces of a document so as to read both surfaces of the document. In recent years, along with the downsizing of an image forming apparatus, there is also a demand for the downsizing of the automatic document conveying device as well as an image forming portion of the image forming apparatus.

FIG. 13 illustrates a related technology of such an automatic document conveying device. The related technology of the automatic document conveying device includes a document stacking tray (101), a pickup roller (102), a sheet feeding roller (103), a conveying drum (104), a front reading roller (105) and a back reading roller (106) disposed so as to be in contact with the conveying drum (104), a branching member (107), a lower inversion roller (108), an upper discharge roller (109), an inversion guide (110), and a discharge tray (111) in this order in a conveying direction (direction of an arrow "a") of a document (D). Further, a document reading position (R) is located below the conveying drum (104) between the front reading roller (105) and the back reading roller (106). For convenience of the description, an upper surface of the document placed on the document stacking tray (101) is referred to as an A-surface and a lower surface thereof is referred to as a B-surface.

When only the A-surface of the document is read, the A-surface of the document (D) supplied by the pickup roller (102) from the document stacking tray (101) is read at the document reading position (R). The branching member (107) is supported so as to be swingable about an axis at its back end. When only the A-surface of the document (D) is read, the branching member (107) is placed at a position indicated by a solid line illustrated in the figure, and the document (D) is discharged to the discharge tray (111).

When both the surfaces (A-surface and B-surface) of the document are read, after the A-surface of the document (D) conveyed from the document stacking tray (101) is read at the document reading position (R), the document (D) is inverted by the lower inversion roller (108), the upper discharge roller (109), and the inversion guide (110) due to the presence of the branching member (107) at a position indicated by a dotted line illustrated in the figure. Then, the document (D) is conveyed to the document reading position (R) and the B-surface is read. The document (D) is further inverted again due to the similar operation and discharged to the discharge tray (111).

In the above-mentioned related technology, the number of members such as a conveying roller for use in the automatic document conveying device is reduced by configuring the automatic document conveying device as described above.

However, drive sources of the branching member (107) and the lower inversion roller (108) are provided separately, and hence there is a problem in that spaces are required for setting the respective drive sources. Further, in a case of using an inexpensive solenoid as a drive source, the noise from the drive source increases, which requires countermeasures against the noise. Consequently, there is also a problem in that the number of parts increases to increase the number of assembly steps, leading to an increase in production cost.

SUMMARY OF THE INVENTION

It is an object of the present invention to provide an automatic document conveying device which is capable of reducing a number of drive sources such as a motor, down-sizing of a drive portion, reducing a number of parts of the drive portion to obtain a simple configuration, and further, capable of suppressing an operation sound to reduce noise, and to provide an image forming apparatus including the automatic document conveying device.

An automatic document conveying device according to an aspect of the present invention, includes: a document feeding portion that feeds a document from a document stacking tray; a conveying portion that conveys the document which is fed, to a document reading portion; a discharge portion that discharges the document after being read to a discharge tray; a branching guide that switches a conveying path so that a second surface is read after a first surface of the document is read; and a switchback portion including a switchback roller pair for sending the document to the conveying portion again after the conveying path is switched by the branching guide, in which a switch of the conveying path by the branching guide and open/close of a nip of the switchback roller pair are performed in one drive portion.

Further features and advantages of the present invention will become apparent from the description of embodiment given below.

DETAILED DESCRIPTION OF PREFERRED EMBODIMENT

An automatic document conveying device and an image forming apparatus including the same according to an embodiment of the present invention are described in detail with reference to the drawings. The present invention is not limited to the embodiment. Further, an intended use, terms, etc. described herein of the present invention are not limited thereto.

Figure 1:
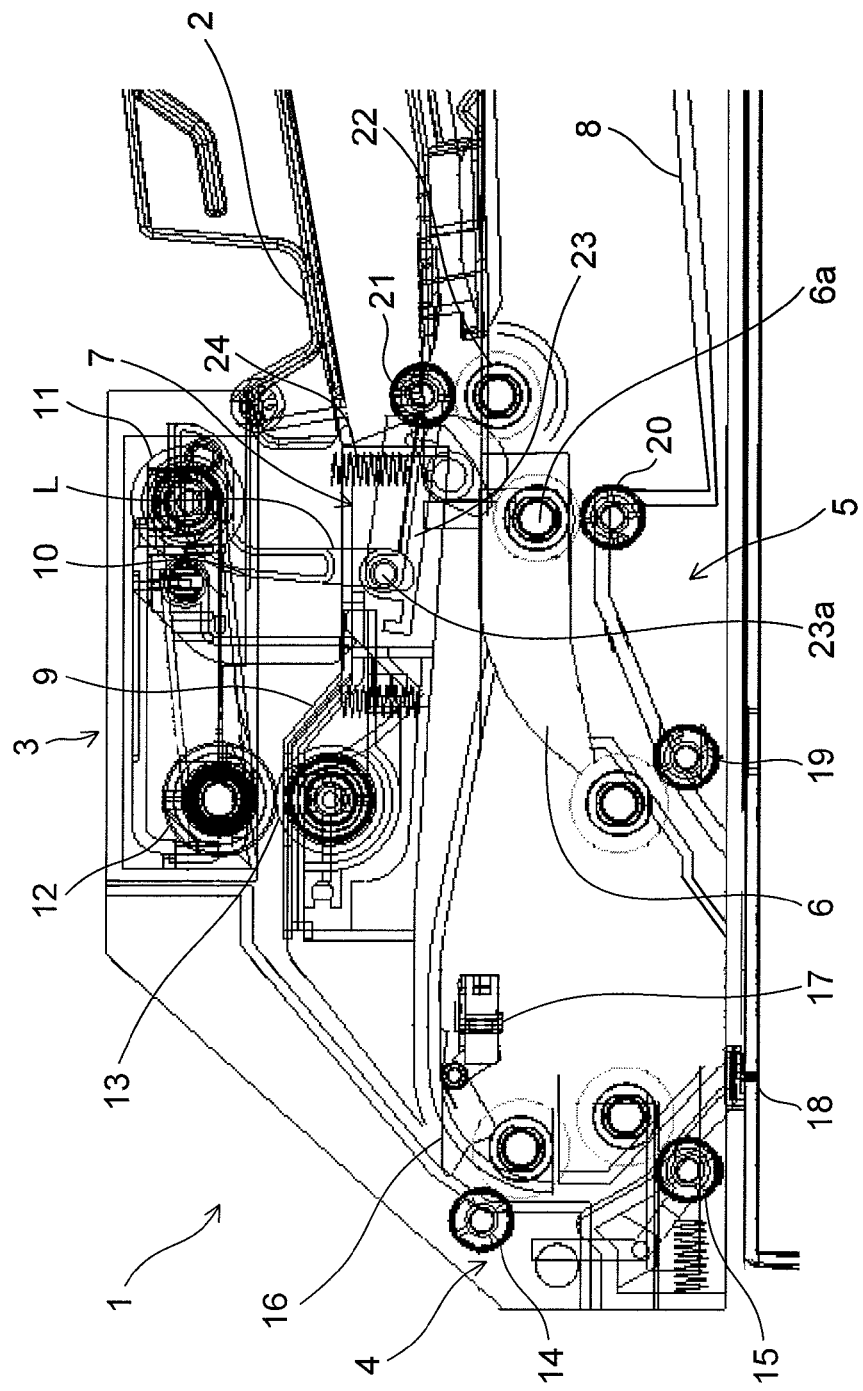
FIG. 1 is a cross-sectional view of an automatic document conveying device according to an embodiment of the present invention.

FIG. 1 is a cross-sectional view of the automatic document conveying device according to the embodiment of the present invention. In the following description, the left side of the figure is assumed to be a leading end of the automatic document conveying device and the right side of the figure is assumed to be a back end thereof.

As illustrated in FIG. 1, an automatic document conveying device (1) includes a document stacking tray (2) on which documents are to be placed, a document feeding portion (3) which supplies documents stacked on the document stacking tray (2) one by one, a conveying portion (4) which conveys a document fed by the document feeding portion (3) to a document reading portion (18), a discharge portion (5) which discharges the document after being read by the document reading portion (18), a branching guide (6) which switches a conveying path of the document, a switchback portion (7) which switches back the document to invert front and back surfaces of the document introduced to the conveying path switched by the branching guide (6) and conveys the document to the conveying portion (4) again, and a document discharge tray (8) which receives the discharged document.

The document stacking tray (2) is provided above the back end side of the automatic document conveying device (1). The document stacking tray (2) is formed in a substantially planar shape, and tilts gently and downwardly toward the leading end of the automatic document conveying device (1), thereby facilitating the supply of the document to the document feeding portion (3). A leading end of the document placed on the document stacking tray (2) comes into contact with a separation wall (9) formed between the document stacking tray (2) and the document feeding portion (3), and passes over the separation wall (9) during the supply of documents, to thereby supply the documents to the document feeding portion (3) one by one. It should be noted that each of the documents placed on the document stacking tray (2) is placed so that a first surface to be a front surface is directed upwardly and a second surface to be a back surface is directed downwardly.

In the vicinity of the leading end of the document stacking tray (2), a set switch (10) which functions as a sensor for detecting the presence/absence of a document is disposed. The set switch (10) is supported above the document stacking tray (2) so as to by swingable. In the set switch (10), when a document is present on the document stacking tray (2), a leading end of the set switch (10) comes into contact with the document, and moves to a retracted position (not shown) on an upper side due to the contact. On the other hand, when documents are no longer present on the document stacking tray (2), the leading end of the set switch (10) moves to a position where the leading end enters a hole (not shown) formed in the document stacking tray (2). When the leading end of the set switch (10) moves to the position where the leading end enters the hole, for example, the leading end of the set switch (10) interrupts an optical path of an optical sensor, and thus the fact that no documents are present on the document stacking tray (2) can be detected.

The document feeding portion (3) includes a pickup roller (11) disposed close to the set switch (10), and a sheet feeding roller (12) and a separation roller (13) disposed on a downstream side of the conveying direction.

The pickup roller (11) is connected to a roller drive source (not shown) such as a motor, and is rotary driven in a clockwise direction by the roller drive source to move to a position where the pickup roller (11) comes into contact with the first surface (front surface) of the document placed on the document stacking tray (2) (the pickup roller (11) is lowered from the position of the pickup roller (11) of FIG. 1).

The sheet feeding roller (12) is disposed so as to be held in contact with the separation roller (13) from above the separation roller (13). The sheet feeding roller (12) is connected to a roller drive source (not shown), and is rotary driven in the clockwise direction by the roller drive source, thereby supplying the documents supplied from the pickup roller (11) to a downstream side one by one together with the separation roller (13). The separation roller (13) is connected to a torque limiter (not shown). In a case where one document is supplied, the separation roller (13) rotates to supply the document to the conveying portion (4), and in a case where at least two documents are supplied, the separation roller (13) stops rotating to prevent overlapped feeding.

The conveying portion (4) includes document conveying roller pairs (14) and (15), and a timing switch (16). The timing switch (16) rotates in a counterclockwise direction to move to a retracted position when the leading end of the document comes into contact with the timing switch (16), and is held at the retracted position until the document completely passes the timing switch (16). Then, after the document completely passes the timing switch (16), the timing switch (16) is returned to the position illustrated in FIG. 1. The timing switch (16) is disposed so as to be associated with, for example, an optical sensor (17), and is configured in such a manner as to open an optical path of the optical sensor (17) when the timing switch (16) moves to the retracted position. The automatic document conveying device (1) detects that the leading end of the document has reached the timing switch (16) when the optical path of the optical sensor (17) is opened. On the other hand, the automatic document conveying device (1) can detect that the document has passed the timing switch (16) when the optical path of the optical sensor (17) is interrupted. Detection information of the document by the timing switch (16) is used for an operation timing of each roller, a branching member, etc. The document reading portion (18) is provided on a downstream side of the document conveying roller pair (15), for reading document information.

The discharge portion (5) includes a post-reading roller (19) and a discharge roller (20). The branching guide (6) is disposed on the downstream side of the document conveying direction of the post-reading roller (19). The branching guide (6) is supported so as to be swingable with respect to a swing center (6a) in a back portion, and is biased in a direction (upward direction) opposite to the discharge portion (5) by a biasing member (not shown). Thus, the leading end of the branching guide (6) moves up/down with respect to the swing center (6a) in the back portion.

In the back portion (right side of FIG. 1) of the branching guide (6), the switchback portion (7) is disposed. The switchback portion (7) includes an upper switchback roller (21), a lower switchback roller (22), and a lift plate (23).

A roller drive source (not shown) is connected to the lower switchback roller (22), and the lower switchback roller (22) can be rotary driven in any of the clockwise and counterclockwise directions. The lift plate (23) is supported so as to be swingable with respect to a swing center (23a) in a leading end of the lift plate (23), and the upper switchback roller (21) is disposed in a back end thereof.

The upper switchback roller (21) is disposed so as to be held in contact with the upper portion of the lower switchback roller (22), and is capable of coming into contact with or being separated from the lower switchback roller (22) due to the swing of the lift plate (23). The lift plate (23) includes a spring (24) that is a biasing member which biases the lift plate (23) in a direction of bringing the upper switchback roller (21) into contact with the lower switchback roller (22). Thus, a nip between the upper switchback roller (21) and the lower switchback roller (22) can be opened/closed.

In the automatic document conveying device (1) according to the present invention, the switch of a conveying path of the branching guide (6) and the open/close of the nip between the upper switchback roller (21) and the lower switchback roller (22) of the switchback portion (7) are performed in one drive portion. The drive portion includes a drive source, a drive member, and a drive transmission mechanism, and the drive transmission mechanism includes a driven member and an operation transmission mechanism which performs the switch operation of the conveying path by the branching guide (6) and the open/close operation of the nip of the switchback roller pair (21, 22).

According to the above-mentioned configuration, the switch of the conveying path of the branching guide and the open/close of the nip of the switchback roller pair are performed in one drive portion. Therefore, the setting space of the drive portion can be reduced. Further, the number of parts of the drive portion can be reduced to obtain a simple configuration, and accordingly the number of assembly steps can be reduced, and hence a production cost can be lowered.

Figure 2:
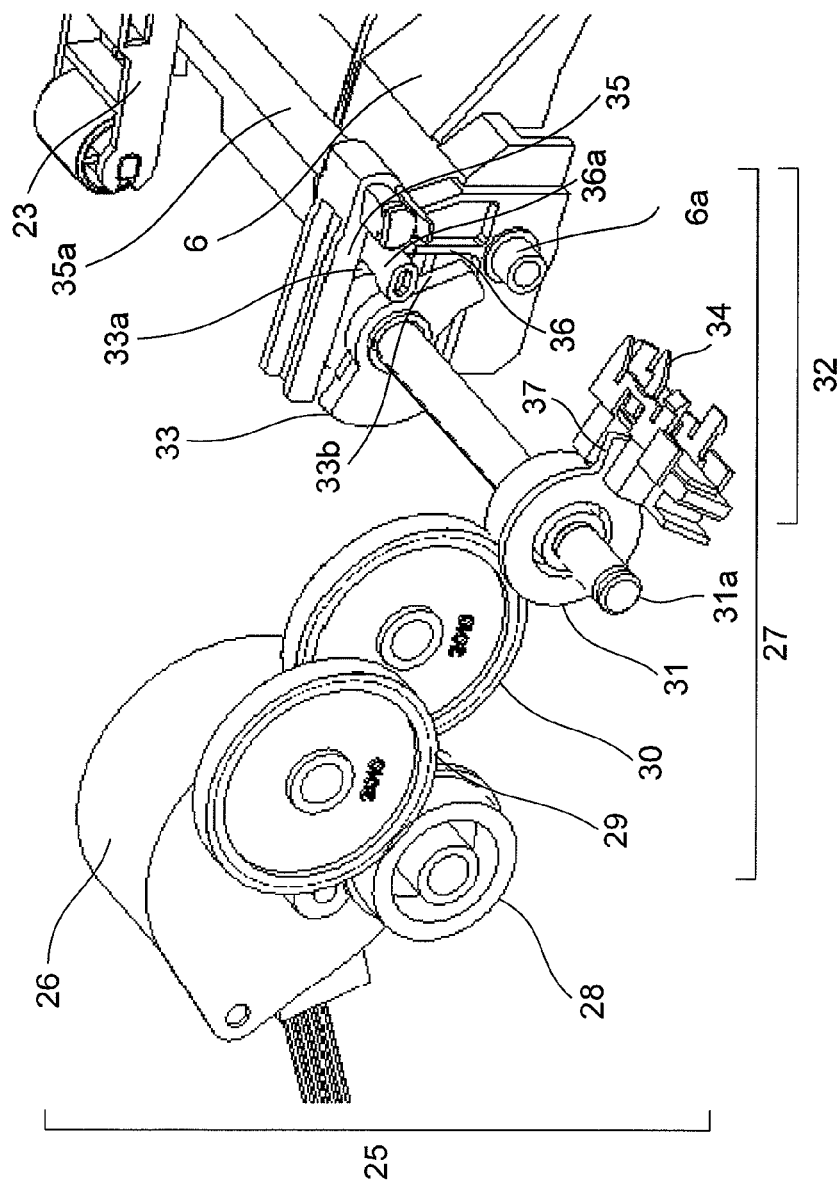
FIG. 2 is a perspective view illustrating a drive portion of the automatic document conveying device according to the present invention.
Figure 3:
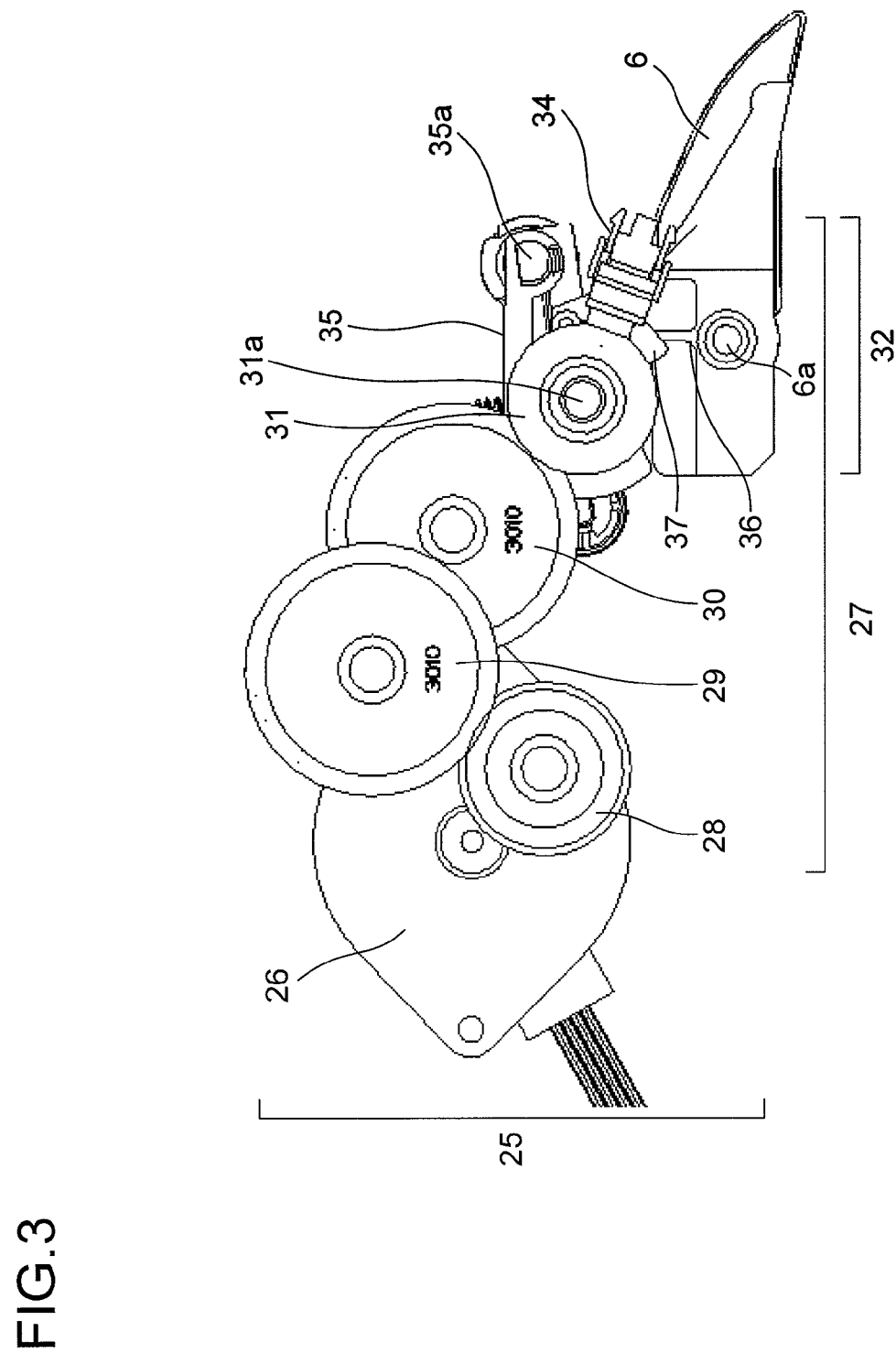
FIG. 3 is a side view illustrating the drive portion of the automatic document conveying device according to the present invention.
Figure 4:
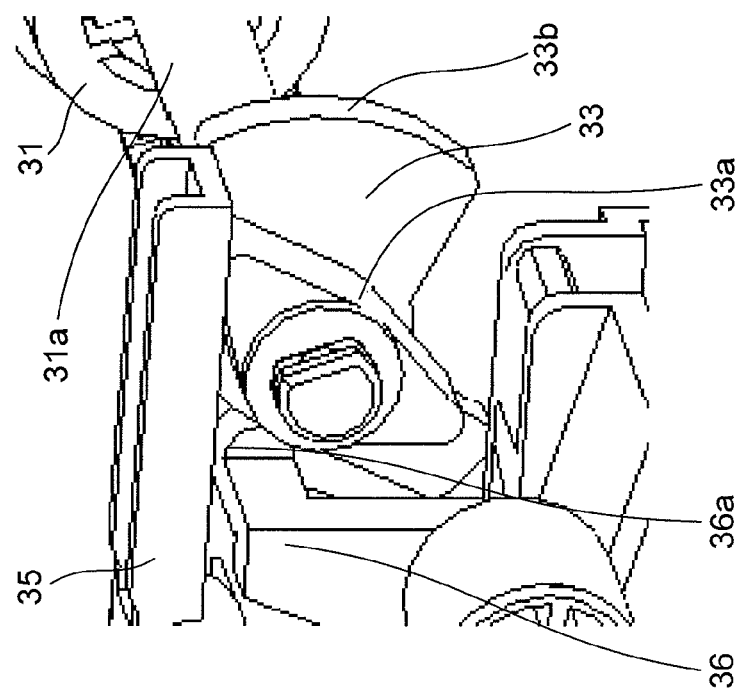
FIG. 4 is an enlarged perspective view illustrating the drive portion of the automatic document conveying device according to the present invention.

Hereinafter, an embodiment of the drive portion is described in detail. FIG. 2 is a perspective view illustrating the drive portion of the automatic document conveying device (1) according to the present invention, FIG. 3 is a side view illustrating the drive portion of the automatic document conveying device (1) according to the present invention, and FIG. 4 is an enlarged perspective view illustrating the drive portion of the automatic document conveying device (1) according to the present invention. FIGS. 2 and 3 are views seen from the back side of FIG. 1.

As illustrated in FIGS. 2 and 3, a drive portion (25) includes a drive source (26) providing a drive force, a drive gear (28) used as a drive member fixed to the drive source (26), and a drive transmission mechanism (27) which transmits the drive force of the drive source (26) to the branching guide (6) and the switchback roller pair (21, 22) via the drive gear (28).

The drive transmission mechanism (27) includes driven gears (29), (30), and (31) used as driven members for transmitting a drive force from the drive gear (28), and an operation transmission mechanism (32) which converts drive forces transmitted from the driven gears (29), (30), and (31) into a switch operation of the conveying path of the branching guide (6) and an open/close operation of the nip of the switchback roller pair (21, 22).

The operation transmission mechanism (32) includes a cam (33) which converts the drive forces transmitted from the driven gears (29), (30), and (31) to the switch operation of the conveying path of the branching guide (6) and the open/close operation of the nip of the switchback roller pair (21, 22), a position detection sensor (34) which is a position detection member that detects a stop position (home position) of the cam (33), and an operation link (35) which is an operation member that transmits the operation converted by the cam (33) to the upper switchback roller (21).

According to the above-mentioned configuration, the configuration of the automatic document conveying device can be further simplified. Thus, the number of assembly steps can be reduced, which can further lower a production cost. Further, control between the switch of the conveying path by the branching guide and the open/close of the nip of the switchback roller pair can be performed precisely. Further, the drive force of the drive source is transmitted to the cam precisely. Further, the automatic conveyance of a document at a time of double-side printing can be performed precisely.

The driven gear (31) is attached to a spindle (31a) extending substantially horizontally in a width direction of a document, and is rotatably provided together with the spindle (31a). The driven gear (31) is engaged with the drive gear (28) via the driven gears (29) and (30), and the drive force of the drive source (26) is transmitted to the driven gear (31). In the case of this embodiment, the drive source (26) includes one motor.

According to the above-mentioned configuration, with a simple configuration, the switch of the conveying path of the branching guide and the open/close of the nip of the switchback roller pair can be performed. Therefore, the setting space of the drive source can be reduced, which can lower a production cost. Further, only one motor is used as the drive source, and hence the noise from the automatic document conveying device can be reduced, compared with the case of using a solenoid, etc. as the drive source, for example.

The cam (33) is fixed to an end portion on a back surface side of the spindle (31a) that is a rotation shaft. This allows the cam (33) to rotate in a perpendicular surface with respect to an axial direction of the spindle, along with rotation of the driven gear (31). Further, the cam (33) includes two portions placed adjacent to each other along the axial direction of the spindle (31a), as illustrated in FIG. 4, and is formed of a first portion having a first circumferential surface (33a) that is a first cam and a second portion having a second circumferential surface (33b) that is a second cam. As illustrated in FIG. 4, the first circumferential surface (33a) of the first portion of the cam (33) is held in contact with a lower surface of the operation link (35), and the second circumferential surface (33b) of the second portion is held in contact with a guide shaft (36) disposed above the branching guide (6) in a perpendicular direction.

According to the above-mentioned configuration, the first cam and the second cam are provided integrally, and hence the drive portion can be down-sized to obtain a simple configuration.

Returning to FIGS. 2 and 3, one end portion of the operation link (35) is fixed to one end portion of a spindle (35a)

extending in a substantially horizontal manner in the width direction of the document, and the other end portion of the spindle (35a) is fixed to the swing center (23a) of the lift plate (23) (see FIG. 1). The operation link (35) is disposed so as to be held in contact with an upper portion of the first circumferential surface (33a) of the cam (33). Thus, the operation link (35) swings following the rotation of the cam (33), and the operation thereof is transmitted to the lift plate (23) of the switchback portion (7) via the spindle (35a). Thus, the upper switchback roller (21) disposed on the lift plate (23) moves up/down about the swing center (23a), and thus, the open/close of the nip between the upper switchback roller (21) and the lower switchback roller (22) is performed.

When the branching guide (6) comes into contact with the second circumferential surface (33b) of the cam (33), the branching guide (6) swings with respect to the swing center (6a) disposed in the back portion thereof along with the movement of the cam (33). The guide shaft (36) is provided above the branching guide (6) in the perpendicular direction from the swing center (6a) of the branching guide (6). The guide shaft (36) is provided with a convex portion (36a) extending horizontally at an upper end portion. The convex portion (36a) is always held in contact with the second circumferential surface (33b) of the cam (33). Thus, the branching guide (6) moves up/down its leading end in the conveying direction of the document along with the rotation of the cam (33), and thus, switches the conveying direction of the document.

The position detection sensor (34) specifies the home position of the cam (33), and is formed of a photointerrupter which is an optical sensor. The position detection sensor (34) includes a light-emitting portion and a light-receiving portion opposed to each other, and a gap is provided therebetween. The position detection sensor (34) identifies light output from the light-emitting portion when the light-receiving portion receives the light, and hence, detects the presence of another member between the light-emitting portion and the light-receiving portion when the light is interrupted.

The driven gear (31) includes a shield plate (37) protruding from a part of the outer circumference of the driven gear (31), and is disposed so that the shield plate (37) enters the gap provided in the position detection sensor (34). More specifically, the driven gear (31) and the cam (33) are driven together, and hence when the position of the shield plate (37) of the driven gear (31) is detected by the position detection sensor (34), the position of the cam (33) can also be specified. Generally, in a case where the shield plate (37) of the driven gear (31) is present in the gap of the position detection sensor (34), the cam (33) is at the home position.

According to the above-mentioned configuration, the stop position of the cam can be controlled precisely.

Due to the above-mentioned configuration, the switch of the conveying path of the branching guide (6) and the open/close of the nip between the upper switchback roller (21) and the lower switchback roller (22) can be performed with one drive portion. In this embodiment, although the drive gear and the driven gear are used as the drive member and the driven member, the drive member and the driven member are not limited thereto. For example, with the use of a drive pulley and a driven pulley as the drive member and the driven member, respectively, a belt may be wound around both the pulleys so as to transmit a drive force.

Figure 5:
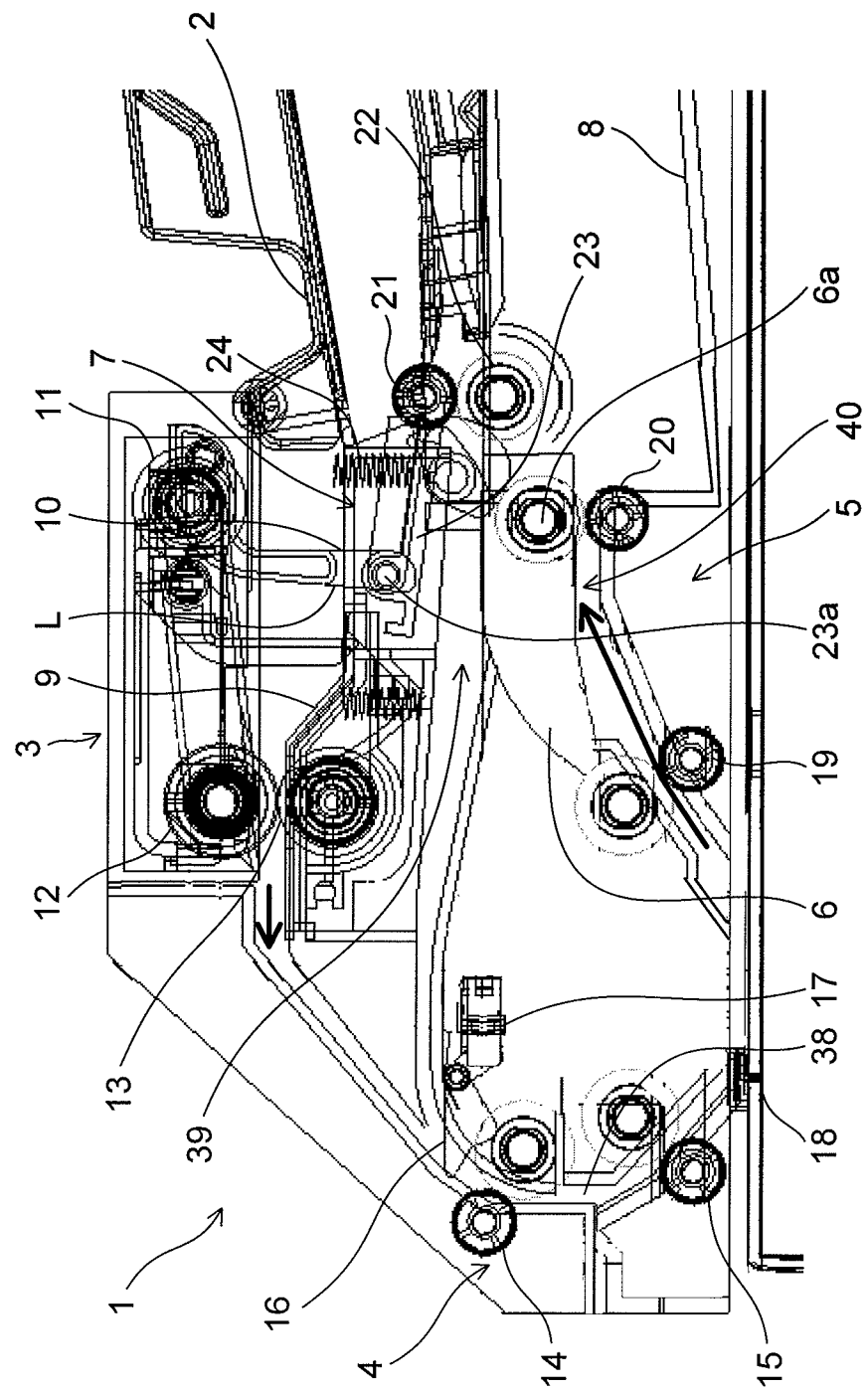
FIG. 5 is a cross-sectional view of the automatic document conveying device according to the embodiment of the present invention during single-side conveyance.
Figure 6:
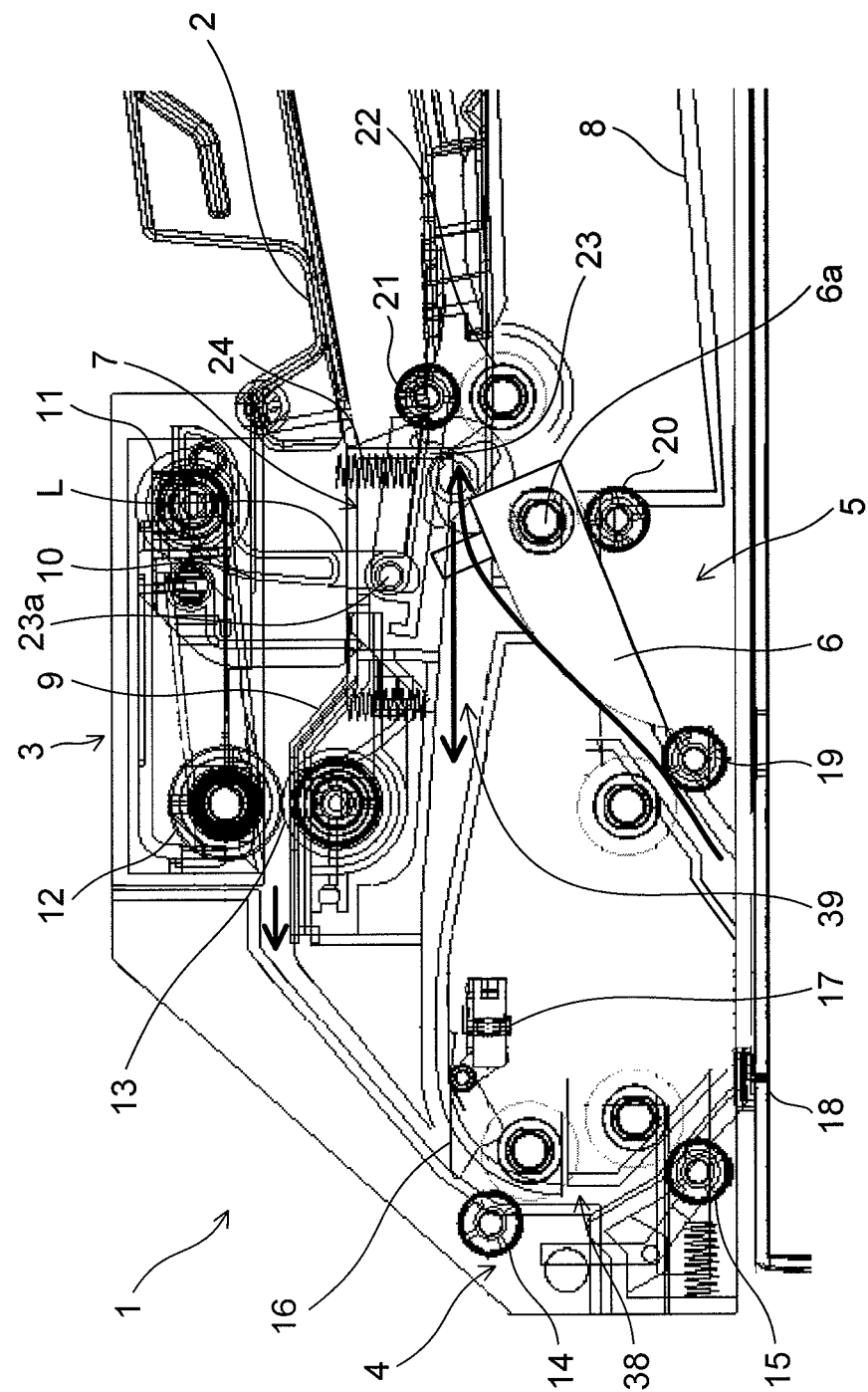
FIG. 6 is a cross-sectional view of the automatic document conveying device according to the embodiment of the present invention during double-side conveyance.

The operation of the above-mentioned automatic document conveying device (1) is described with reference to the drawings. FIG. 5 is a cross-sectional view of the automatic document conveying device according to the embodiment of the present invention during single-side conveyance, and FIG. 6 is a cross-sectional view of the automatic document conveying device according to the embodiment of the present invention during double-side conveyance. In the following description, for convenience, the position of the branching guide (6) illustrated in FIG. 5 is assumed to be an initial position. Arrows in the figures indicate the conveying direction of the document.

A conveying path of a document in a case of reading only one side (first surface) of the document is described below in detail with reference to FIG. 5.

When documents are placed on the document stacking tray (2), the set switch (10) is retracted upward, and thus, the preparation for conveying the documents is completed. Only the first surfaces of the documents are read, and hence the cam (33) is not driven from the home position.

When the automatic document conveying device (1) receives a start signal input from an operation panel (not shown), the pickup roller (11) is rotated in the clockwise direction. Then, the pickup roller (11) is lowered to a position where the pickup roller (11) comes into contact with the documents placed on the document stacking tray (2) to supply the document on an uppermost side to the document conveying path (38). The documents supplied from the pickup roller (11) are supplied to the document conveying path (38) by the separation roller (13) one by one.

When the leading end of the supplied document passes the timing switch (16), the passage of the document is detected, and the information thereof is utilized for an operation timing of each roller, the branching guide, etc. Then, the document is conveyed to the document reading portion (18) by the document conveying roller pairs (14) and (15), and is discharged to the document discharge tray (8) due to the rotation of the post-reading roller (19) and the discharge roller (20) in the clockwise direction.

A conveying path of a document in a case of reading both surfaces (first and second surfaces) of the document is described below in detail with reference to FIG. 6.

When documents are placed on the document stacking tray (2), the set switch (10) is retracted upward, and thus, the preparation for conveying the documents is completed.

When the automatic document conveying device (1) receives a start signal input from the operation panel (not shown), the pickup roller (11) is rotated in the clockwise direction. Then, the pickup roller (11) is lowered to a position where the pickup roller (11) comes into contact with the documents placed on the document stacking tray (2) to supply the document on the uppermost side to the document conveying path (38). The documents supplied from the pickup roller (11) are supplied to the document conveying path (38) by the separation roller (13) one by one.

When the leading end of the supplied document passes the timing switch (16), the passage of the document is detected, and the drive source (26) (see FIG. 3) starts driving. Thus, the cam (33) (see FIG. 3) starts rotating, and the branching guide (6) is disposed at a position illustrated in FIG. 6 in accordance with the rotation of the cam (33). After the document passes through the document conveying path (38) and the first surface thereof is read by the document reading portion (18), the document is sent to the switchback conveying path (39) by the post-reading roller (19). The conveyed document is conveyed to the switchback conveying path (39) due to the rotation of the lower switchback roller (22) in the clockwise direction, and is inverted. After being inverted, the document is sent to the document conveying path (38) again due to the inverse rotation of the lower switchback roller (22) in the counterclockwise direction. The position of the branching guide (6) at this time has returned to the home position (position of FIG.

5). This can prevent the document from being sent inversely from the switchback conveying path (39) to a document discharge path (40). The timing of the inversion of the document is measured based on the passage time of the leading end of the document detected by the timing switch (16).

After the document is detected by the timing switch (16) again, the second surface is read by the document reading portion (18). The branching guide (6) is disposed at the position illustrated in FIG. 6 again, and the document is conveyed to the switchback conveying path (39) to be inverted. After being inverted, the document is sent to the document conveying path (38). However, the document is not read in the document reading portion (18). Next, the position of the branching guide (6) is set at the home position (position of FIG. 5). Consequently, the document is discharge onto the document discharge tray (8) by the post-reading roller (19) and the discharge roller (20). The conveyance of the document without being subjected to reading is performed so as to adjust the front and back sides of the documents.

The rotation operation of the cam at the time of reading both surfaces of the document, the branching guide, and the open/close operation state of the nip of the switchback roller pair are described in detail with reference to FIGS. 7 to 12, and the conveying path of the document is described in detail with reference to FIGS. 5 and 6.

Figure 7:
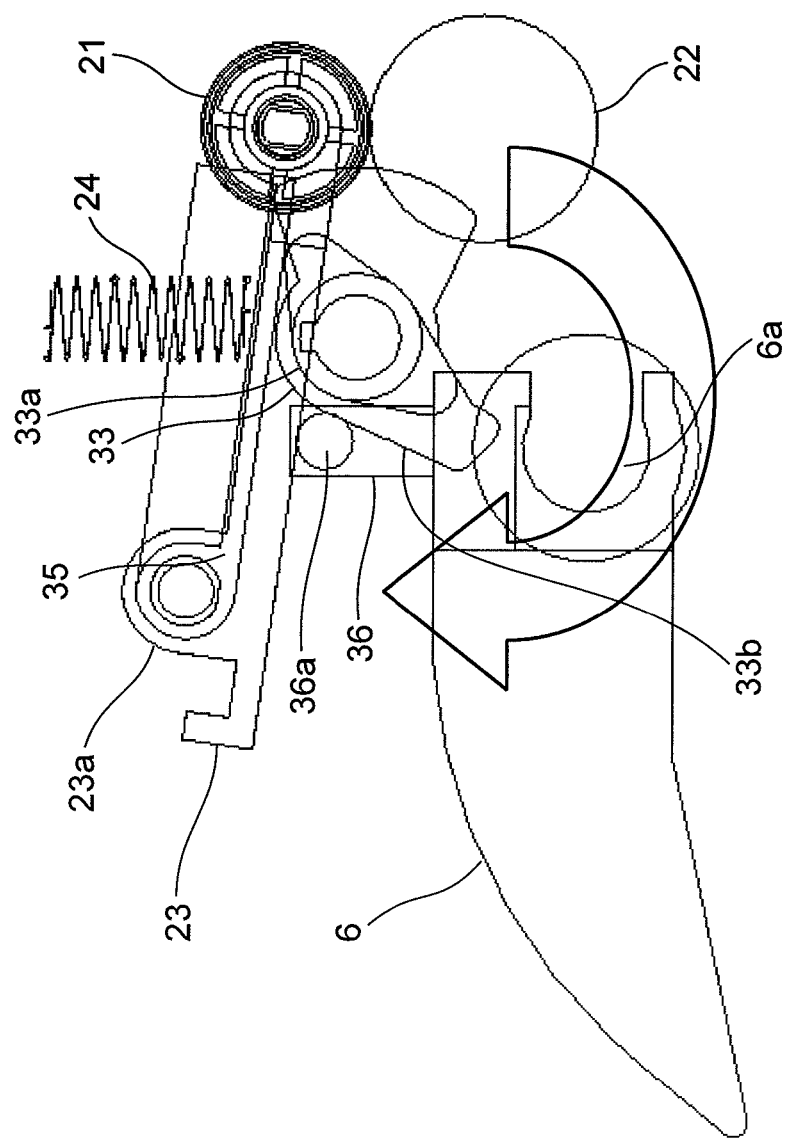
FIG. 7 is a first operation state diagram of a cam, a branching guide, and a switchback roller pair of the automatic document conveying device according to the embodiment of the present invention.
Figure 8:
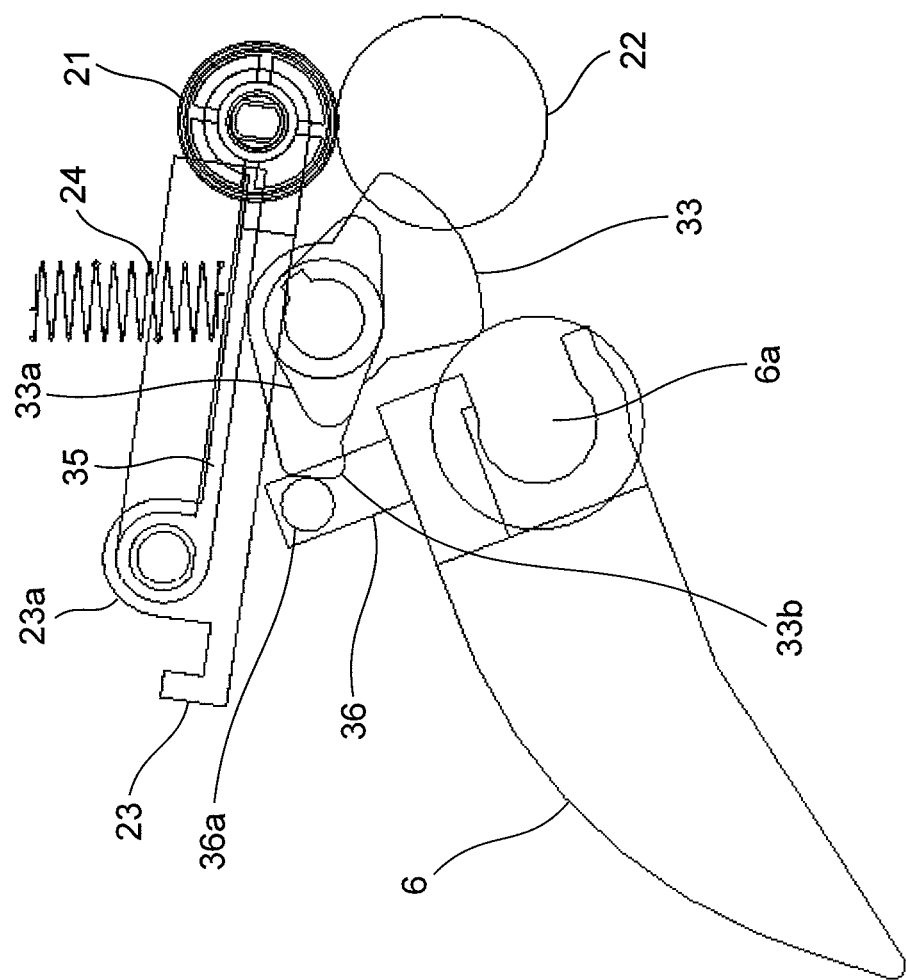
FIG. 8 is a second operation state diagram of the cam, the branching guide, and the switchback roller pair of the automatic document conveying device according to the embodiment of the present invention.
Figure 9:
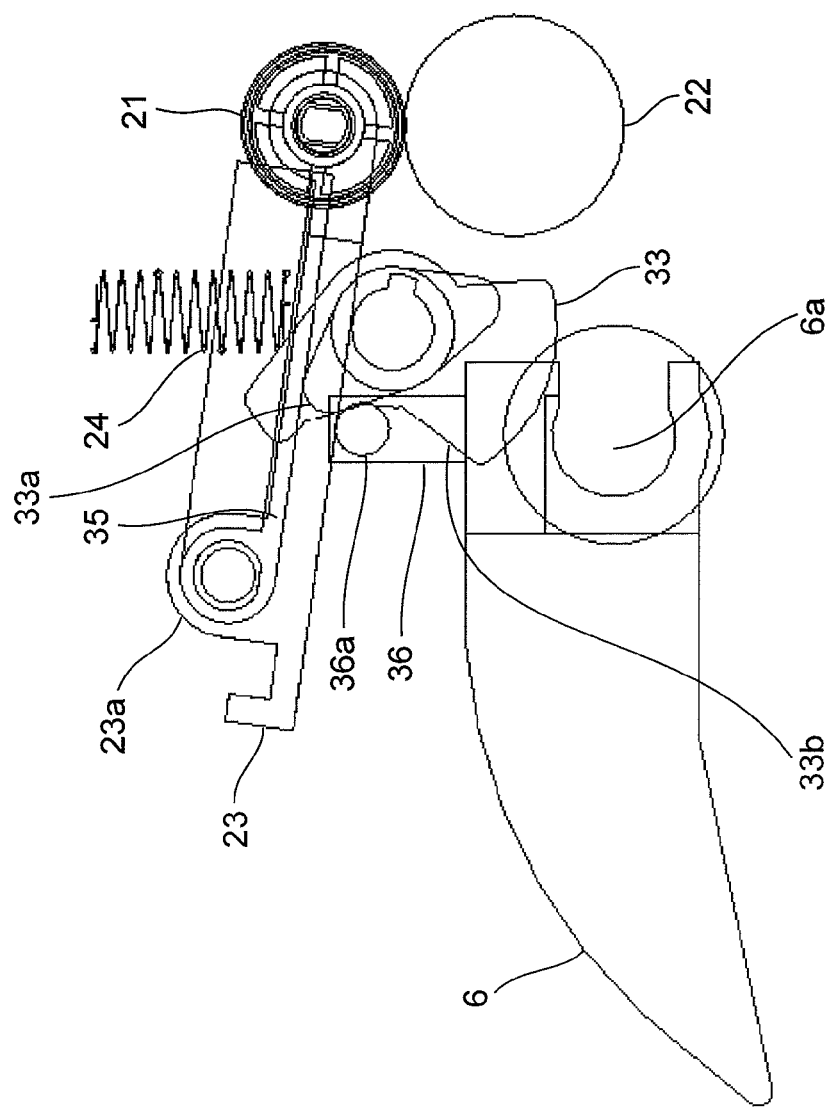
FIG. 9 is a third operation state diagram of the cam, the branching guide, and the switchback roller pair of the automatic document conveying device according to the embodiment of the present invention.
Figure 10:
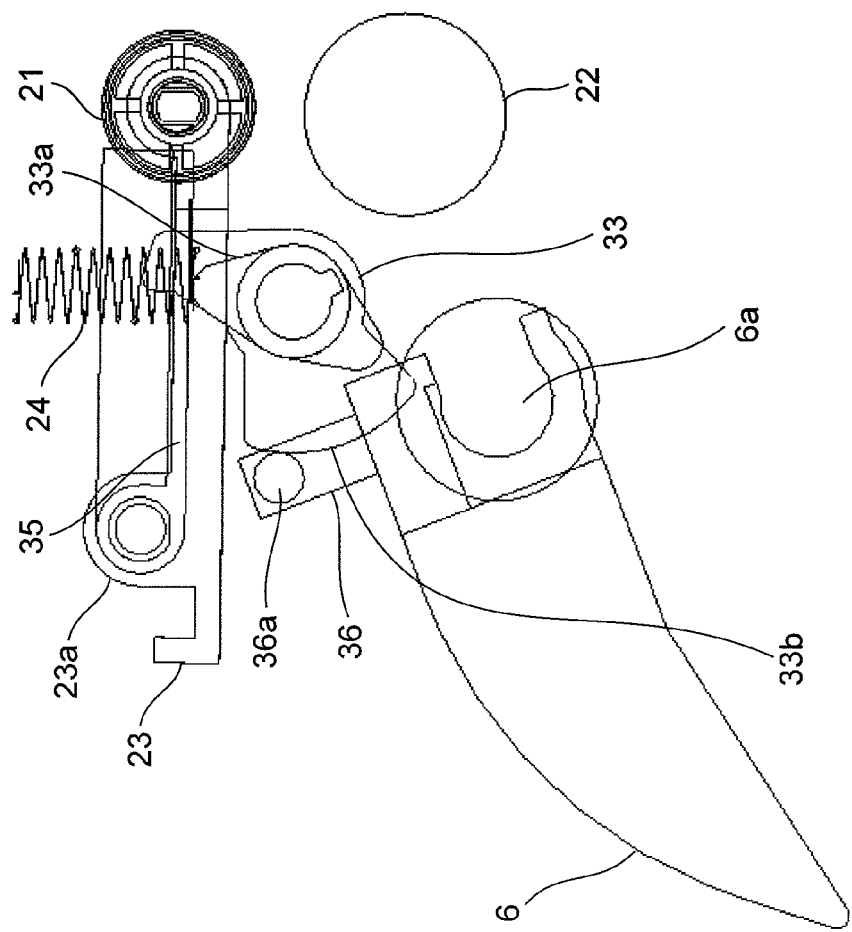
FIG. 10 is a fourth operation state diagram of the cam, the branching guide, and the switchback roller pair of the automatic document conveying device according to the embodiment of the present invention.
Figure 11:
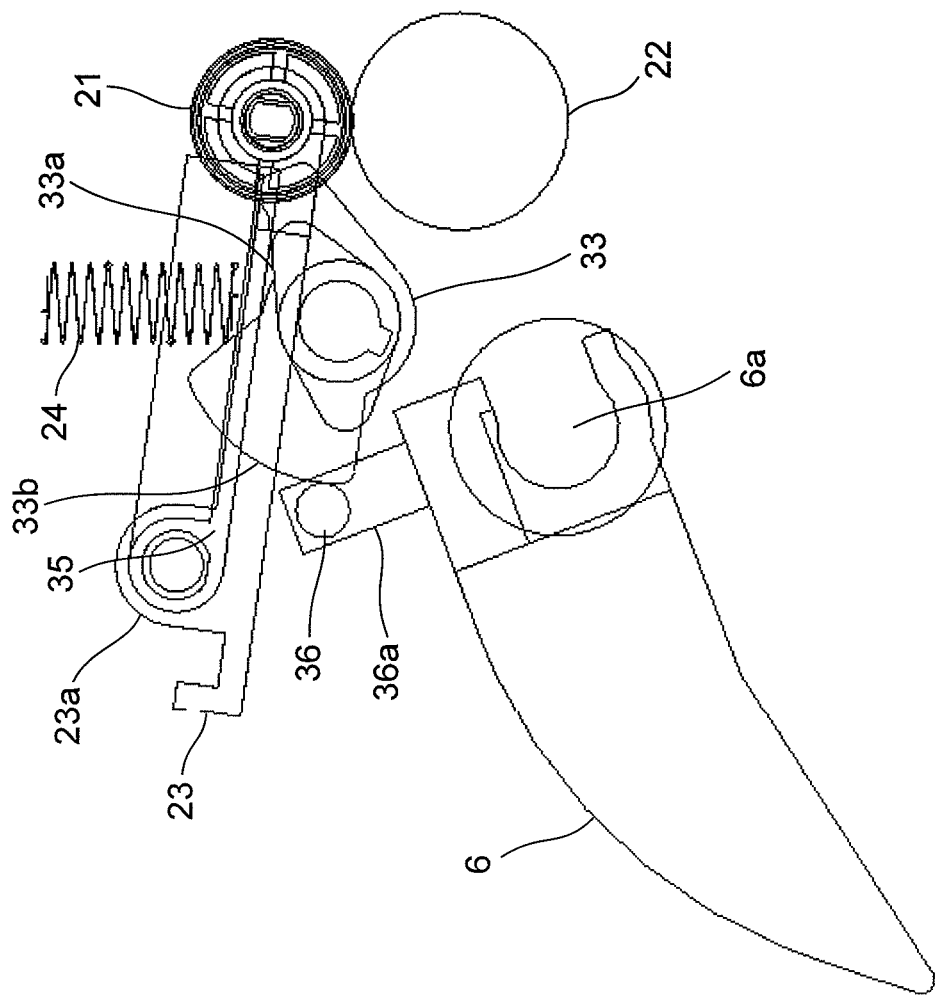
FIG. 11 is a fifth operation state diagram of the cam, the branching guide, and the switchback roller pair of the automatic document conveying device according to the embodiment of the present invention.
Figure 12:
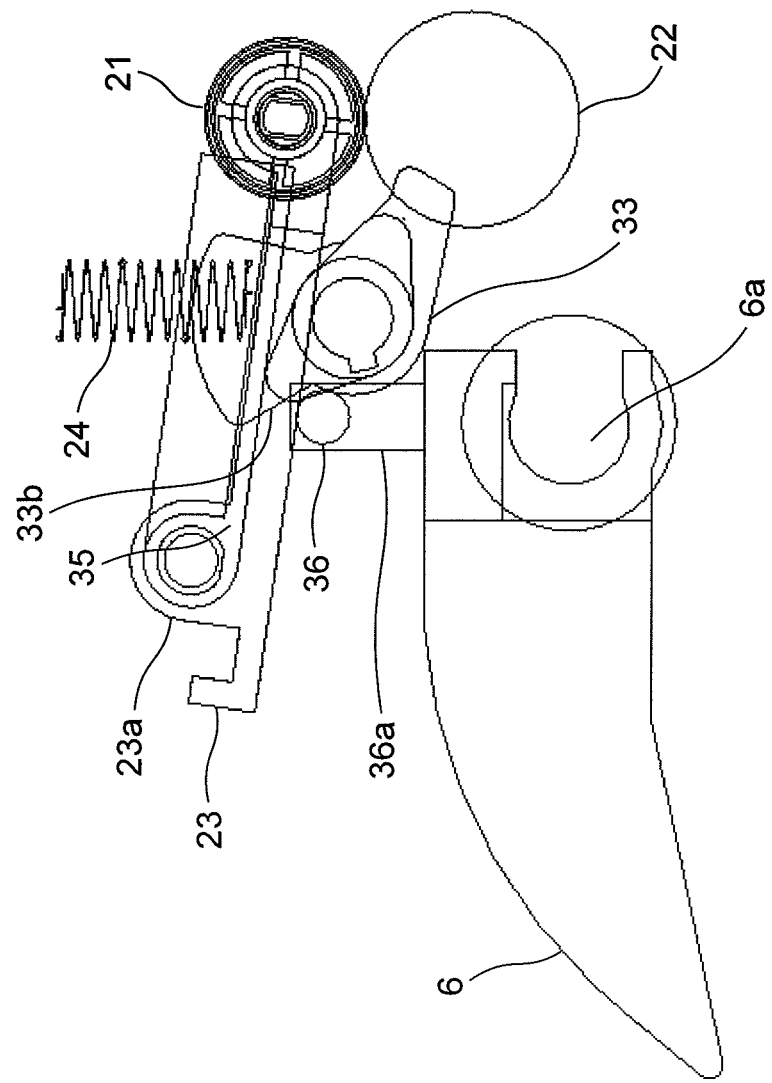
FIG. 12 is a sixth operation state diagram of the cam, the branching guide, and the switchback roller pair of the automatic document conveying device according to the embodiment of the present invention.
Figure 13:
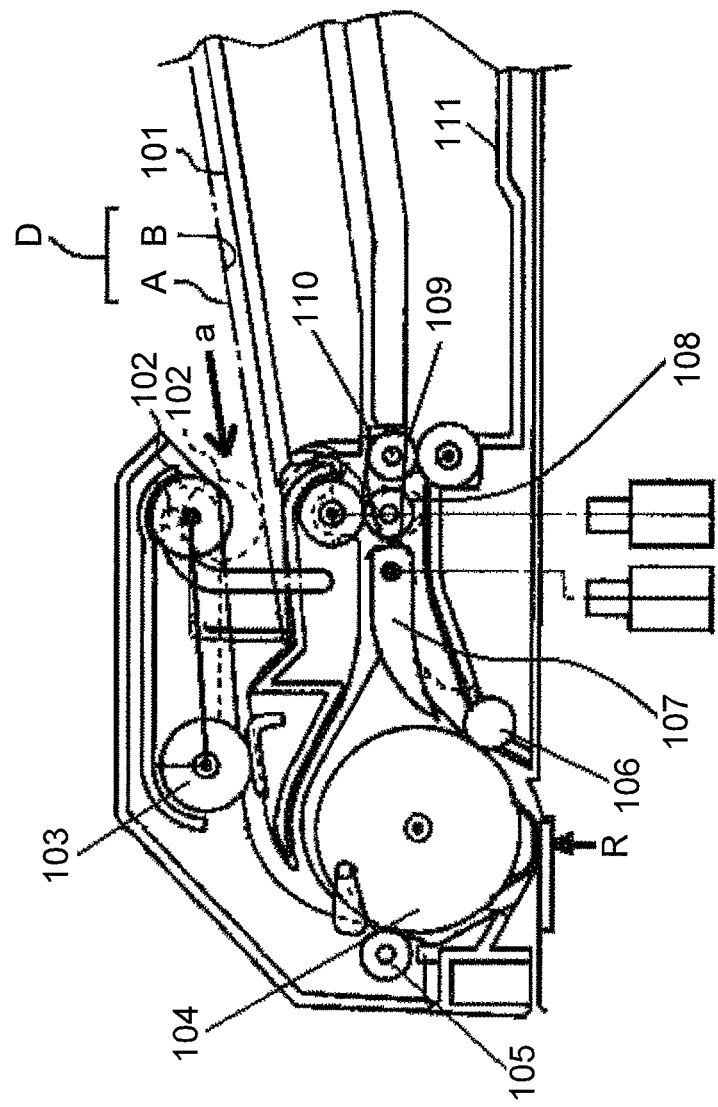
FIG. 13 is a cross-sectional view of an automatic document conveying device of a related technology.

FIG. 7 illustrates a state of the cam (33) from the start of the operation of the automatic document conveying device (1) to the reading of the first surface of the document, and also illustrates an open/close state of the nip of the switchback roller pair (21, 22) from the reading of the first surface of the document to the conveyance of the document to the switchback conveying path (39). FIG. 8 illustrates a state of the cam (33) from the reading of the first surface of the document to the conveyance of the document to the switchback conveying path (39), and also illustrates the open/close state of the nip of the switchback roller pair (21, 22) from the reading of the first surface of the document to the conveyance of the document to the switchback conveying path (39). FIG. 9 illustrates a state of the cam (33) when the document is conveyed from the switchback conveying path (39) to the document conveying path (38), and also illustrates the open/close state of the nip of the switchback roller pair (21, 22) from the reading of the first surface of the document to the conveyance of the document to the switchback conveying path (39). Further, FIG. 10 illustrates a state of the cam (33) from the reading of the second surface of the document to the conveyance of the document to the switchback conveying path (39), and also illustrates the open/close state of the nip of the switchback roller pair (21, 22) from the reading of the first surface of the document to the conveyance of the document to the switchback conveying path (39). FIG. 11 illustrates a state of the cam (33) when the document has arrived at the switchback conveying path (39), and also illustrates the open/close state of the nip of the switchback roller pair (21, 22) from the reading of the first surface of the document to the conveyance of the document to the switchback conveying path (39). FIG. 12 illustrates a state of the cam (33) when the document is conveyed from the switchback conveying path (39) to the document conveying path (39), and also illustrates the open/close state of the nip of the switchback roller pair (21, 22) from the reading of the first surface of the document to the conveyance of the document to the switchback conveying path (39). Regarding each of the cam (33) and the branching guide (6), when the cam (33) and the branching guide (6) are located at the positions illustrated in FIG. 7, a left side thereof in the figure is assumed to be a leading end, a right side thereof in the figure is assumed to be a back end, an upper side thereof in the figure is assumed to be an upper portion, and a lower side thereof in the figure is assumed to be a lower portion. In the following description, the positions of the cam (33), the upper switchback roller (21), and the branching guide (6) illustrated in FIG. 7 are assumed to be respective home positions.

As described above, the first circumferential surface (33a) of the cam (33) is held in contact with the operation link (35), and the second circumferential surface (33b) is always held in contact with the convex portion (36a) of the guide shaft (36) of the branching guide (6). Thus, the branching guide (6) is operated in accordance with the rotation of the cam (33), and the upper switchback roller (21) connected to the operation link (35) is also operated in accordance with the rotation of the cam (33). Here, the direction in which the cam (33) rotates is the clockwise direction as indicated by the arrow of FIG. 7.

As illustrated in FIG. 7, during a period from the start of the operation of the automatic document conveying device (1) to the reading of the first surface of the document, the cam (33) is not operated. Thus, the branching guide (6) and the upper switchback roller (21) are at the home positions, and the nip between the upper switchback roller (21) and the lower switchback roller (22) is closed.

FIG. 8 illustrates the operation of the cam (33) from the reading of the first surface of the document to the conveyance of the document to the switchback conveying path (39). The leading end of the second circumferential surface (33b) of the cam (33) pushes the convex portion (36a) of the guide shaft (36) of the branching guide (6) to the leading end direction. Thus, the branching guide (6) is rotated about the swing center (6a) and the leading end of the branching guide (6) is pushed downwardly. Consequently, as illustrated in FIG. 6, the document conveying path (38) to the document discharge tray (8) is closed by the branching guide (6), and the document is conveyed to the switchback conveying path (39). In this case, the nip between the upper switchback roller (21) and the lower switchback roller (22) remains in a closed state, and hence, the conveyance of the document to the switchback conveying path (39) due to the rotation of the lower switchback roller (22) in the clockwise direction is completed.

When the document is conveyed from the switchback conveying path (39) to the document conveying path (38), as illustrated in FIG. 9, the cam (33) is rotated in the clockwise direction, and the convex portion (36a) of the guide shaft (36) of the branching guide comes into contact with a concave portion in the lower portion formed between the leading end and the back end of the circumferential surface (33b) of the second surface of the cam (33). Thus, the leading end of the branching guide (6) is pushed up, and the branching guide (6) returns to the initial position. This allows the state illustrated in FIG. 5 to be obtained, and the document is prevented from being sent inversely from the switchback conveying path (39) to the document discharge path (40) and is conveyed to the document conveying path (39) precisely.

When the document is conveyed to the document conveying path (38), and the leading end thereof reaches the nip of the document conveying roller pair (14) (see FIG. 6), as illustrated in FIG. 10, the cam (33) is further rotated, and the leading end of the first circumferential surface (33a) of the cam (33) comes into contact with the operation link (35). The operation link (35) is connected to the swing center (23a) of the lift plate (23) (see FIG. 2) of the switchback portion (7) via the spindle (35a). Thus, the lift plate (23) is pushed upwardly with respect to the swing center (23a) of the leading end. Thus, the upper switchback roller (21) is pushed up, and the upper switchback roller (21) and the lower switchback roller (22) are separated from each other. Further, the back end of the second circumferential surface (33b) of the cam (33)

pushes the convex portion (36a) of the guide shaft (36) of the branching guide (6), and the leading end of the branching guide (6) is pushed downwardly with respect to the swing center (6a). Thus, the document is supplied to the switchback conveying path (39) after the second surface is read.

According to the above-mentioned configuration, even if the switchback roller pair is separately disposed from the branching guide, the conversion operation of the second cam is transmitted by the operation link that is an operation member. Therefore, the first and second cams may be provided integrally to obtain a simple configuration.

There is a time period when the conveying directions become opposite between the leading end and the back end of a document, and hence it is necessary to open the nip of the switchback roller pair (21, 22). Specifically, in a case where the length of the document is equal to or more than a predetermined length, there is a case where the leading end of the document has reached the switchback conveying path (39), whereas the back end of the document still remains in the switchback conveying path (39), during reading of the second surface. In this case, it is necessary to convey the leading end of the document in the right direction of the switchback roller pair (21, 22), whereas it is necessary to convey the back end of the document in the left direction of the switchback roller pair (21, 22), i.e., in the document conveying path (38) direction. Thus, the conveying directions become opposite between the leading end and the back end of the document, which makes it impossible to convey the document by the switchback roller pair (21, 22). Therefore, it is necessary to open the nip of the switchback roller pair (21, 22).

When the document reaches the switchback conveying path (39), as illustrated in FIG. 11, the cam (33) is further rotated, and the lower portion of the first circumferential surface (33a) of the cam (33) comes into contact with the operation link (35). Thus, the lift plate (23) of the switchback portion (7) is pushed down through the force of the spring (24) with respect to the swing center (23a) of the leading end of the lift plate (23), and the upper switchback roller (21) provided at the back end of the lift plate (23) comes into contact with the lower switchback roller (22). At this time, the back end of the second circumferential surface (33b) of the cam (33) still remains in contact with the convex portion (36a) of the guide shaft (36) of the branching guide (6). Therefore, the leading end of the branching guide (6) remains in a pushed-down state.

When the document is conveyed again from the switchback conveying path (39) to the document conveying path (38), as illustrated in FIG. 12, the cam (33) is further rotated in the clockwise direction, and the convex portion (36a) of the guide shaft (36) of the branching guide comes into contact with a concave portion in the upper portion of the second circumferential surface (33b) of the cam (33). Thus, the leading end of the branching guide (6) is pushed upwardly and the branching guide (6) returns to the initial position. Thus, the document is prevented from being conveyed inversely from the switchback conveying path (39) to the document discharge path (40) and is conveyed to the document conveying path (38) precisely.

Next, the document is conveyed through the document conveying path (38) to the document reading portion (18). Then, the conveyance of the document without being subjected to the reading is performed by the post-reading roller (19) and the discharge roller (20), and is discharged onto the document discharge tray (8). At this time, the cam (33) is rotated once, and the cam (33) and the branching guide (6) return to the home positions illustrated in FIG. 7.

When the document is conveyed by the automatic document conveying device (1) described above, and when the image data on the document is read by the document reading portion (18), a toner image is formed on the sheet based on the image data on the document by an electrophotographic process in the image forming apparatus including the automatic document conveying device (1).

According to the above-mentioned configuration, there can be provided an image forming apparatus including an automatic document conveying device, which is capable of reducing the number of drive sources such as a motor, down-sizing of the drive portion, reducing the number of parts of the drive portion to obtain a simple configuration, and further, capable of suppressing an operation sound to reduce noise.

The automatic document conveying device and the image forming apparatus including the same according to the present invention can be utilized preferably in various copiers, printers, and facsimiles.

What is claimed is:

1. An automatic document conveying device, comprising:
    a document feeding portion that feeds a document from a document stacking tray;
    a conveying portion that conveys the document which is fed, to a document reading portion;
    a discharge portion that discharges the document after being read to a discharge tray;
    a branching guide that switches a conveying path so that a second surface is read after the first surface of the document is read;
    a contact portion that is provided on the branching guide;
    a switchback roller pair for sending the document to the conveying portion again after the conveying path is switched by the branching guide;
    a biasing member that biases the switchback roller pair in a direction of bringing the switchback roller pair into mutual contact;
    a lift member that swings to bring the switchback roller pair out of mutual contact;
    one drive source that provides a drive force;
    a drive member that is fixed to the drive source;
    a driven member that transmits the drive force from the drive member; and
    a cam that is moved by the driven member, wherein the cam comprises
    a first cam that is moved by the driven member so as to rotate the lift member in a direction of bringing the switchback roller pair out of mutual contact against a biasing force of the biasing member, and
    a second cam that makes contact with the contact portion and that, by being moved by the driven member, makes the contact portion swing so that, as the contact portion swings, the conveying path of the branching guide is switched, and wherein
    the first and second cams are provided integrally.

2. An automatic document conveying device according to claim 1, wherein the first cam and the second cam are provided at a rotation shaft having the driven member attached thereto.

3. An automatic document conveying device according to claim 1, wherein each of the drive member and the driven member comprises a gear.

4. An automatic document conveying device according to claim 1, further comprising an operation transmission mechanism that includes an operation member that makes contact with the first cam, that swings as the first cam moves, and that, while swinging, makes the lift member swing.

5. An image forming apparatus comprising the automatic document conveying device according to claim 1.

* * * * *